Jan. 2, 1934.  E. R. MAURER ET AL  1,942,181
MECHANISM FOR CONTROLLING DELIVERY VEHICLES
Filed Aug. 1, 1929  3 Sheets-Sheet 1
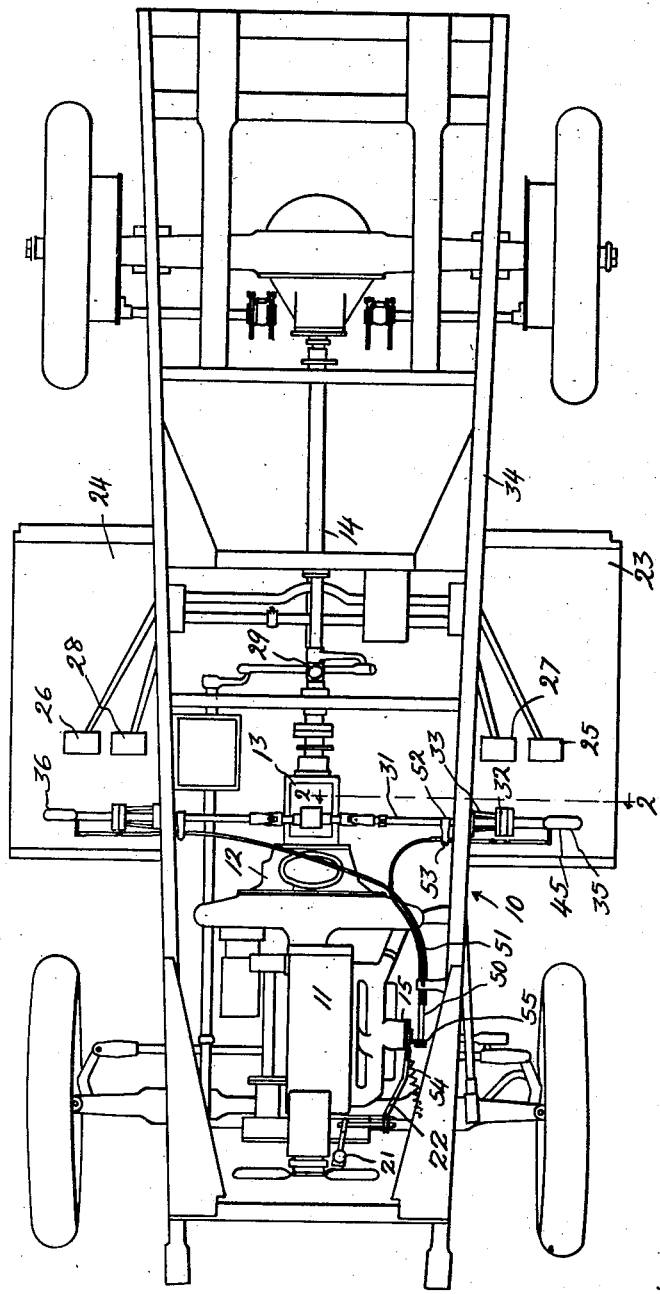
INVENTORS
Edwin R. Maurer
Donald M. Ferguson
BY
Whittemore Hulbert Whittemore
& Belknap  ATTORNEYS

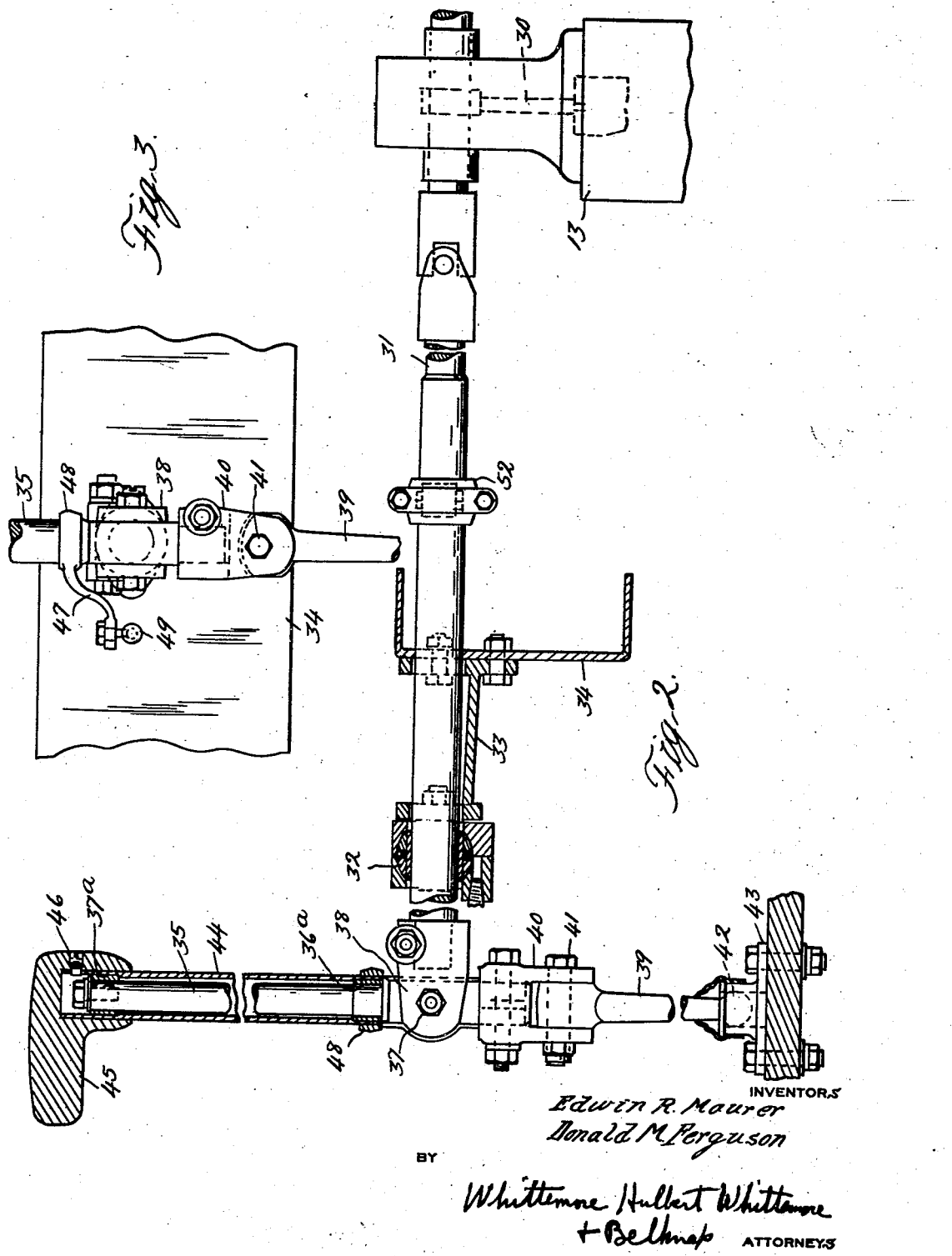

Jan. 2, 1934.   E. R. MAURER ET AL   1,942,181
MECHANISM FOR CONTROLLING DELIVERY VEHICLES
Filed Aug. 1, 1929   3 Sheets-Sheet 3

INVENTORS
Edwin R. Maurer
Donald M. Ferguson
BY
Whittemore Hulbert Whittemore
+ Belknap   ATTORNEYS Patented Jan. 2, 1934

1,942,181

UNITED STATES PATENT OFFICE 1,942,181

MECHANISM FOR CONTROLLING DELIVERY VEHICLES

Edwin R. Maurer, Detroit, and Donald M. Ferguson, Highland Park, Mich., assignors, by mesne assignments, to Continental-Divco Company, Detroit, Mich., a corporation of Michigan Application August 1, 1929. Serial No. 382,813

7 Claims. (Cl. 180—77)

The invention relates to control mechanism for motor vehicles, particularly of the type designed for house-to-house delivery purposes. The main object of the invention is to provide a construction having greater adaptability over the controlling mechanism of the vehicle so as to aid the operator in quickly getting the vehicle under way.

Our invention is applicable to a vehicle driven by an internal combustion engine and having a selective gear transmission, and the invention consists in a novel arrangement of controlling mechanisms for simultaneously operating the throttle of the engine and the gear shift elements of the transmission. In the specific embodiment of the invention hereinafter described and illustrated, a plurality of controlling units are provided in various parts of the vehicle so located as to permit the operator to manipulate the vehicle from several different points. However, in the broader aspects of the invention it is contemplated that a single controlling mechanism might be employed and so constructed as to provide the dual functions of gear shift control and throttle control.

In the drawings:

Figure 1 is a plan view of a chassis showing the arrangement of throttle control mechanism;

Figure 2 is a sectional view taken transversely of the chassis on the line 2—2 of Figure 1 illustrating the shifting lever and the throttle control mechanism;

Figure 3 is a side view of the shifter lever;

Figure 4:
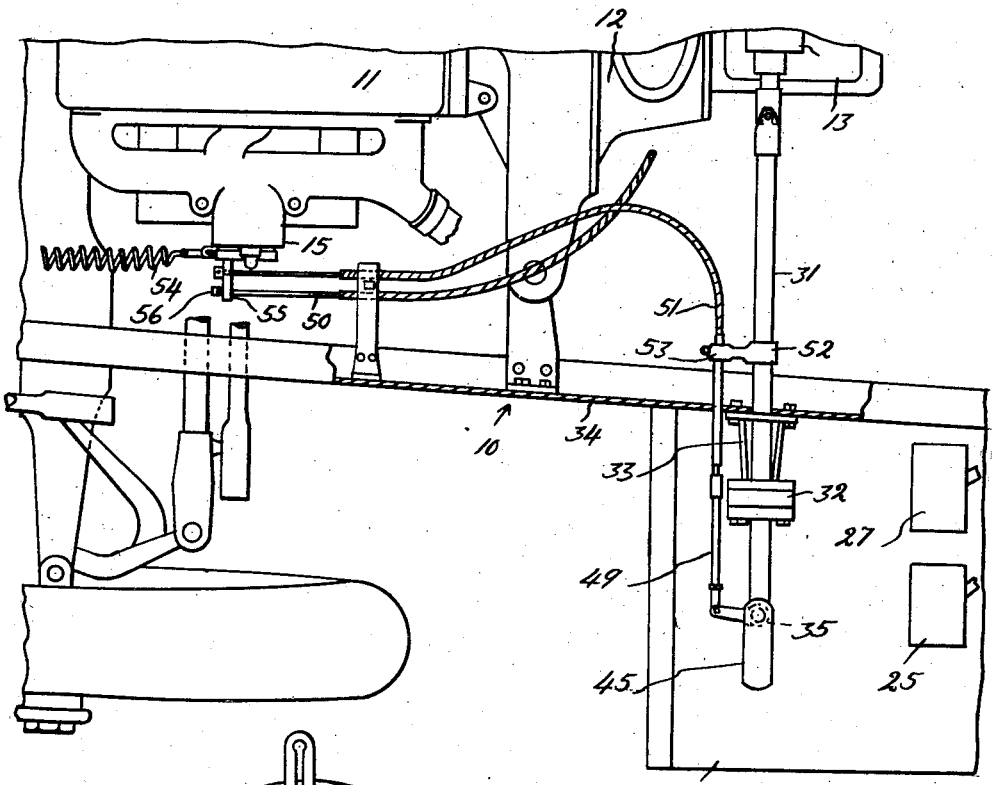
Figure 4 is a plan view of a portion of the control mechanism.
Figure 5:
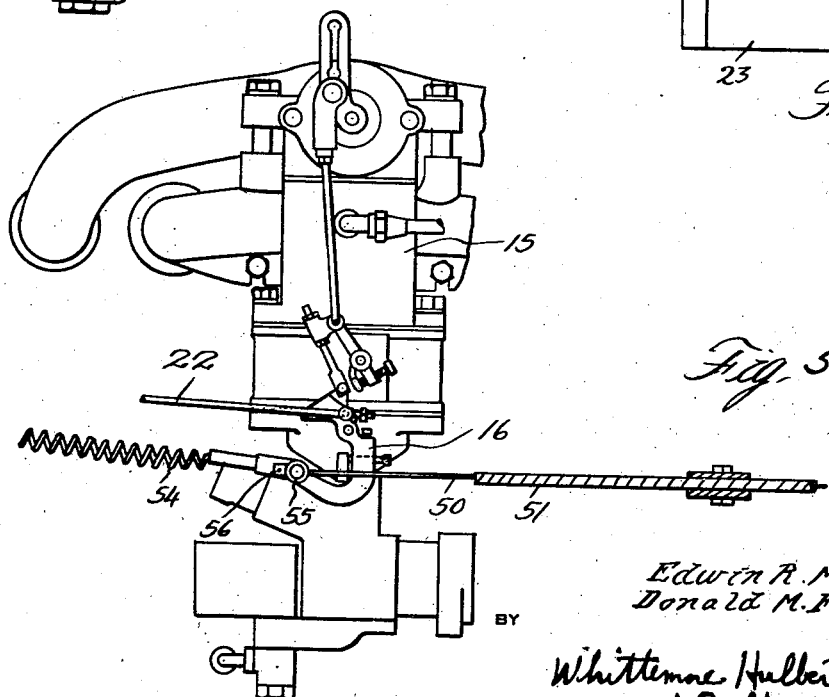
Figure 5 is a detailed view of the throttle connections at the carburetor.

Referring now to the details of construction as illustrated in the drawings, the chassis 10 of the vehicle has an internal combustion engine 11 mounted thereon, the drive passing through the clutch housing 12 to the selective gear transmission 13 and thence through propeller shaft 14 to the rear axle. The engine is provided with a suitable carburetor 15 having a throttle therein actuated by means of a throttle lever 16.

The vehicle herein illustrated has side operating platforms 23 and 24 on which are mounted certain controls. These controls include the outer pedals 25 and 26 connected to both the clutch and brake mechanisms and the inner pedals 27 and 28 connected to the brake mechanism. There is also a center steering mast 29 arranged in such a position as to be accessible to the operator when he is on either of the operating platforms.

The transmission 13 is shifted in the usual manner by means of a lever 30 arranged to oscillate forwardly and rearwardly in two laterally spaced planes. In order to operate this lever from the several controlling positions on the vehicle, it is mounted on a transversely extending shaft 31, which shaft is rotatable and longitudinally shiftable in bearings 32 supported by brackets 33 on the side rails 34. For operating the shaft 31 there are provided two vertical gear shift levers 35 and 36 mounted on the opposite operating platforms 23 and 24. Each lever is pivotally connected by a pin 37 to a yoke 38 secured to the end of the shaft 31. The lever has an extension 39 pivotally connected thereto to permit oscillation about an axis transverse to the axis of the pin 37. For this purpose there is provided a yoke 40 secured to the lever 35 and straddling the end of the extension 39 and pivotally secured thereto by a pin 41. The lower end of the extension 39 has a ball 42 formed thereon engaging a socket in the bracket 43 secured to the operating platform. It will be observed that with this construction a lateral movement of the upper end of the lever 35 causes the same to fulcrum about the ball and socket joint on the running board and thereby axially move the shaft 31. On the other hand, a movement of the upper end of the lever 35 in a longitudinal direction causes the same to fulcrum on the shaft bearing 32, this movement being permitted by reason of the pivotal connection at the pin 41. In this manner the shifting of the transmission gearing is accomplished by the movement of the control lever 35 simulating the conventional gear shift lever movement.

Surrounding the upper end of the lever 35 is a tubular sleeve 44 rotatable relative to the lever on spacer bushings 36ᵃ and 37ᵃ. The upper end of the sleeve 44 has secured thereto a handle 45 which in the preferred construction extends transversely of the lever on one side only of the longitudinal axis thereof. The handle is suitably secured to the sleeve by means of a set screw 46. At the lower end of the sleeve 44 above the pivotal connection 37 there is a lever 47 having a collar 48 secured to the sleeve. This lever extends substantially at right angles to the axis of the shaft 31 and is connected by a link 49 to the end of a flexible wire 50 which in turn is arranged within the flexible conduit 51. The wire and conduit form a Bowden wire control mechanism. 52 is a bracket mounted on the shaft 31 on the opposite side of the frame sill 34 from the shift lever 35. The bracket has a clamping collar 53 for anchoring the end of the flexible conduit 51 so that upon movement of the shaft 31 either rotatively or axially the Bowden wire control will be correspondingly moved without affecting the relative positions of the wire 50 and conduit 51. The conduit is carried from this point to adjacent the carburetor 15 where the conduit is fixedly anchored in a bracket secured to the engine and the wire is operatively connected to the throttle lever 16. In the preferred connection the throttle lever 16 is urged toward closed position by a spring 54 and the wire 50 has a lost motion connection with the lever. Thus as shown, there is a pin 55 extending transversely of the lever 16 having two apertures therein through which the wires 50 from the control mechanisms on opposite sides of the vehicle project. Each wire has a collar 56 adapted to engage the lever to open the throttle but permitting the throttle lever to move toward open position independently of the wire. In this manner the throttle may be actuated independently of the control handles 45 by the linkage 22 from the foot accelerator 21 and also the throttle may be actuated by the handle on either control lever 35 or 36 independently of the other handle.

From the foregoing, the operation of the throttle from the control handles on the respective gear shift levers will be readily understood. Rotation of the handle about the axis of the gear shift lever causes a corresponding movement of the lever 47 which through the linkage connection 49 moves the inner wire 50 relative to the conduit 51 and causes collar 56 to move the throttle lever 16. The throttle is therefore opened by movement of the handle 45 but is closed by the spring 54 which also urges the handle 45 to its initial position.

From the construction heretofore described, it will be observed that our invention contemplates the provision of a mechanism adapted to be manually operated and capable of simultaneously controlling the speed of the internal combustion engine and the change gears in the transmission. Thus in the particular construction of vehicle above described, the operator can completely control the vehicle while standing without requiring the shifting of the hands from one control to another. One hand is used for steering and the other hand is used for shifting the gears and controlling the motor at the same time, while one foot is used for controlling the clutch and the brake. Thus our invention provides a very effective controlling mechanism for a vehicle of the house-to-house delivery type.

While we have described one particular embodiment of our invention, it is to be understood that the invention may be embodied in other forms. Thus our invention contemplates the construction wherein only a single gear shift lever is employed having the throttle controlling mechanism mounted thereon so as to be capable of simultaneous operation with the gear shift.

What we claim as our invention is:

1. In a motor vehicle, a chassis, a throttle controlled internal combustion engine, a change speed transmission, a rockable lever mounted in an offset position with respect to said transmission, a connection between said lever and said transmission capable of rotative and longitudinal movements, a handle mounted on and movable relative to said lever and a Bowden wire connection between said handle and the throttle of said engine, said Bowden wire connection having the flexible conduit thereof fixedly mounted on said first connection, said handle having a hand gripping portion thereof projecting laterally from said lever.

2. In a motor vehicle, a chassis, a motor, a transmission, a low level operating platform, a vehicle steering device positioned for operation by one hand of the operator while standing on said platform, a brake pedal positioned for operation by one foot of the operator while standing on said platform with his other foot, a control lever for operating said transmission positioned to be manipulated by the other hand of the operator from said low level platform, a handle rotatably mounted on said lever and having a transversely extending handle grip at the top of said lever and means connected to said rotatable handle for controlling the speed of the motor by the rotatable adjustment of said handle grip.

3. In a motor vehicle, a chassis, a motor, a transmission, a low level operating platform, a vehicle steering device positioned for operation by one hand of the operator while standing on said platform, a brake pedal positioned for operation by one foot of the operator while standing on said platform with his other foot, a control lever for operating said transmission positioned to be manipulated by the other hand of the operator from said low level platform, a handle rotatably mounted on said lever and having a transversely extending handle grip at the outer end of said lever and a Bowden wire connection between said handle and the throttle of said engine.

4. In a motor vehicle, a chassis, a power unit supported upon the chassis having a variable speed transmission and a throttle controlled engine, a low level platform also supported from the chassis, a vehicle steering device positioned for operation by one hand of the operator while standing on said platform, a brake pedal positioned for operation by one foot of the operator while standing on said platform with his other foot, a control lever for operating the transmission positioned to be manipulated from the low level platform and supported upon the latter for universal movement, a handle rotatably mounted upon said lever formed with a laterally extending grip for actuating the same, and means establishing an operative connection between the handle and engine throttle for actuating the latter upon rotation of the handle.

5. In a vehicle of the house-to-house delivery type having a driving motor and transmission cooperating therewith, the combination of a chassis having front and rear wheels, a driving platform for the operator supported by the chassis between said front and rear wheels at a relatively low level whereby to provide convenient approach of the operator to said platform, a pedal operable to brake the vehicle by actuation of one foot of the driver while standing on the other foot on said platform, means operable to steer said front wheels by actuation of one hand of the operator while standing on said platform, and means operable to actuate said transmission by actuation of the other hand of the operator while standing on said platform, said last named means including a shiftable lever provided with a lateral handle extension relatively rotatable with respect to said lever and positioned at the outer end thereof, said lateral handle extension being adapted to control the speed of said motor.

6. In a vehicle of the house-to-house delivery type having a driving motor and transmission cooperating therewith, the combination of a chassis having front and rear wheels, a driving platform for the operator supported by the chassis between said front and rear wheels at a relatively low level whereby to provide convenient approach of the operator to said platform, a pedal operable to brake the vehicle by actuation of one foot of the driver while standing on the other foot on said platform, means operable to steer said front wheels by actuation of one hand of the operator while standing on said platform, and means operable to actuate said transmission by actuation of the other hand of the operator while standing on said platform, one of said means having a laterally offset handle element associated therewith and adapted for movement relative thereto for controlling the speed of said motor.

7. In a vehicle of the house-to-house delivery type having a driving motor and transmission cooperating therewith, the combination of a chassis having front and rear wheels, a driving platform for the operator supported by the chassis between said front and rear wheels at a relatively low level whereby to provide convenient approach of the operator to said platform, a pedal operable to brake the vehicle by actuation of one foot of the driver while standing on the other foot on said platform, means operable to steer said front wheels by actuation of one hand of the operator while standing on said platform, and means operable to actuate said transmission by actuation of the other hand of the operator while standing on said platform, said last named means including a shiftable lever provided with a lateral handle extension relatively rotatable with respect to said lever and positioned at the outer end thereof, said lateral handle extension being adapted to control the speed of said motor, said pedal, steering means and transmission actuating means being cooperatively located for operation while the operator is in substantially one position of location on said platform.

EDWIN R. MAURER.
DONALD M. FERGUSON.